H. P. HANSEN.
TYPE SETTING MACHINE.
APPLICATION FILED SEPT. 20, 1911. RENEWED NOV. 20, 1915.
1,188,762.
Patented June 27, 1916.
6 SHEETS—SHEET 4.
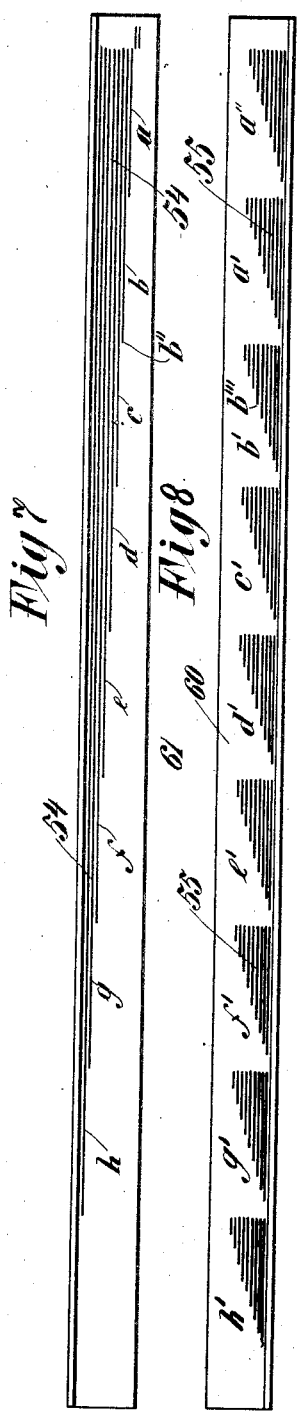
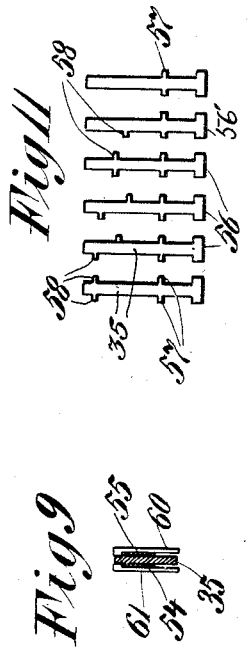
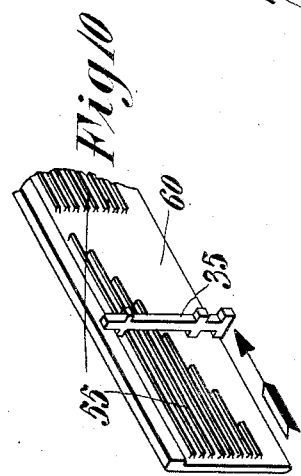
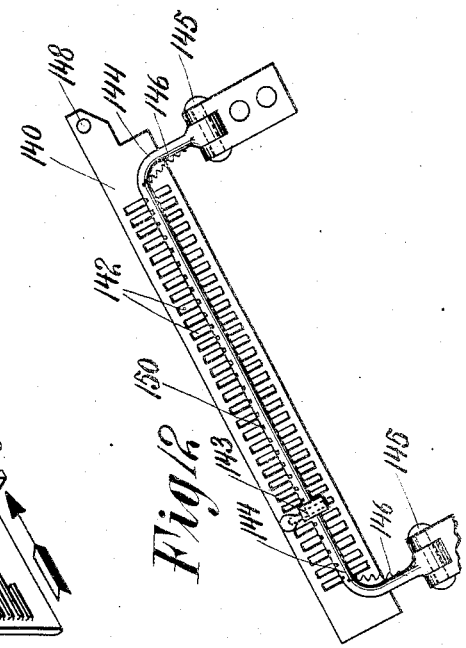
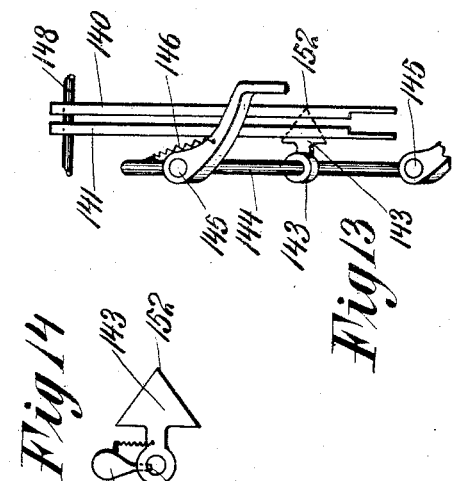
Hans Peter Hansen, Inventor

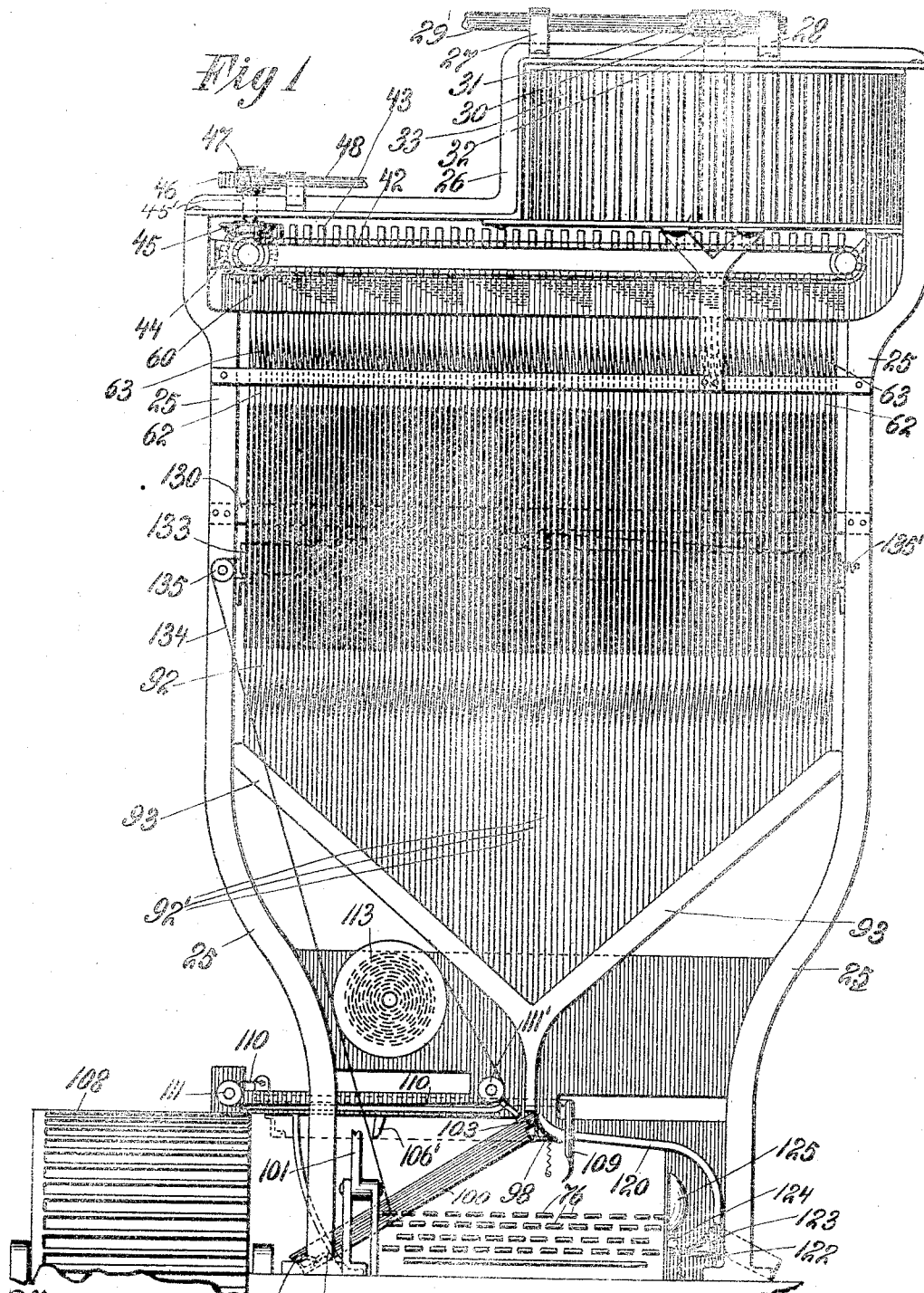

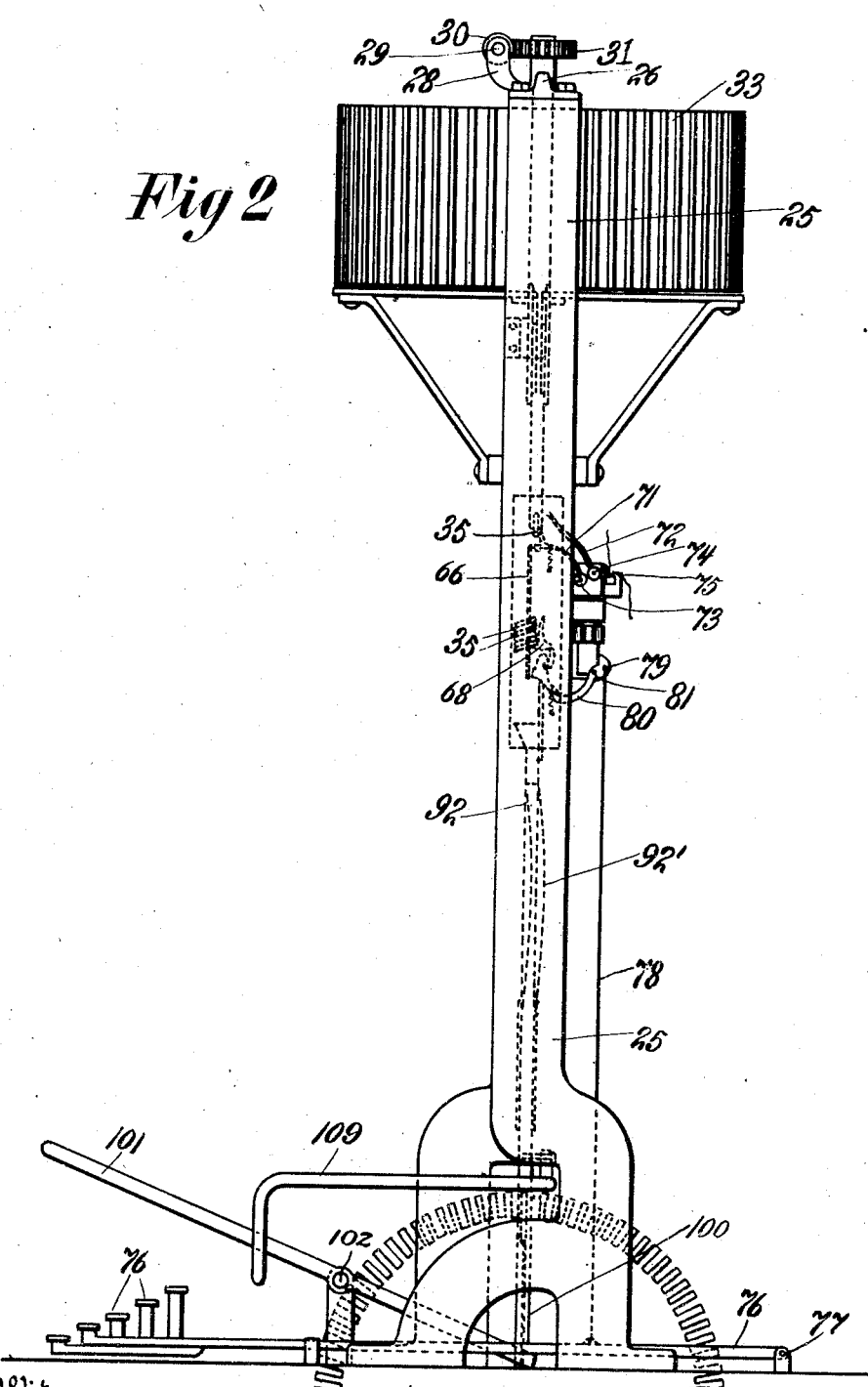

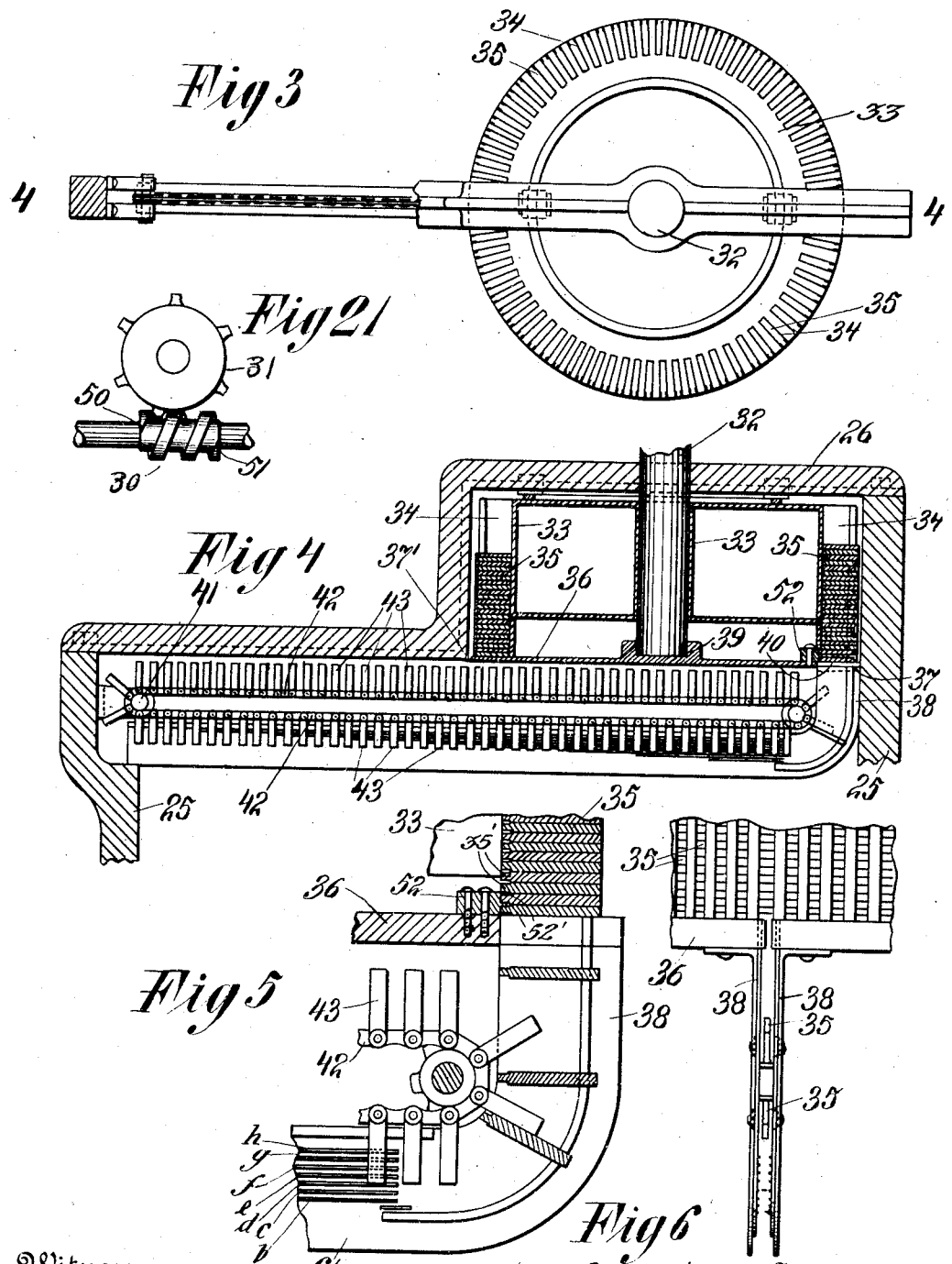

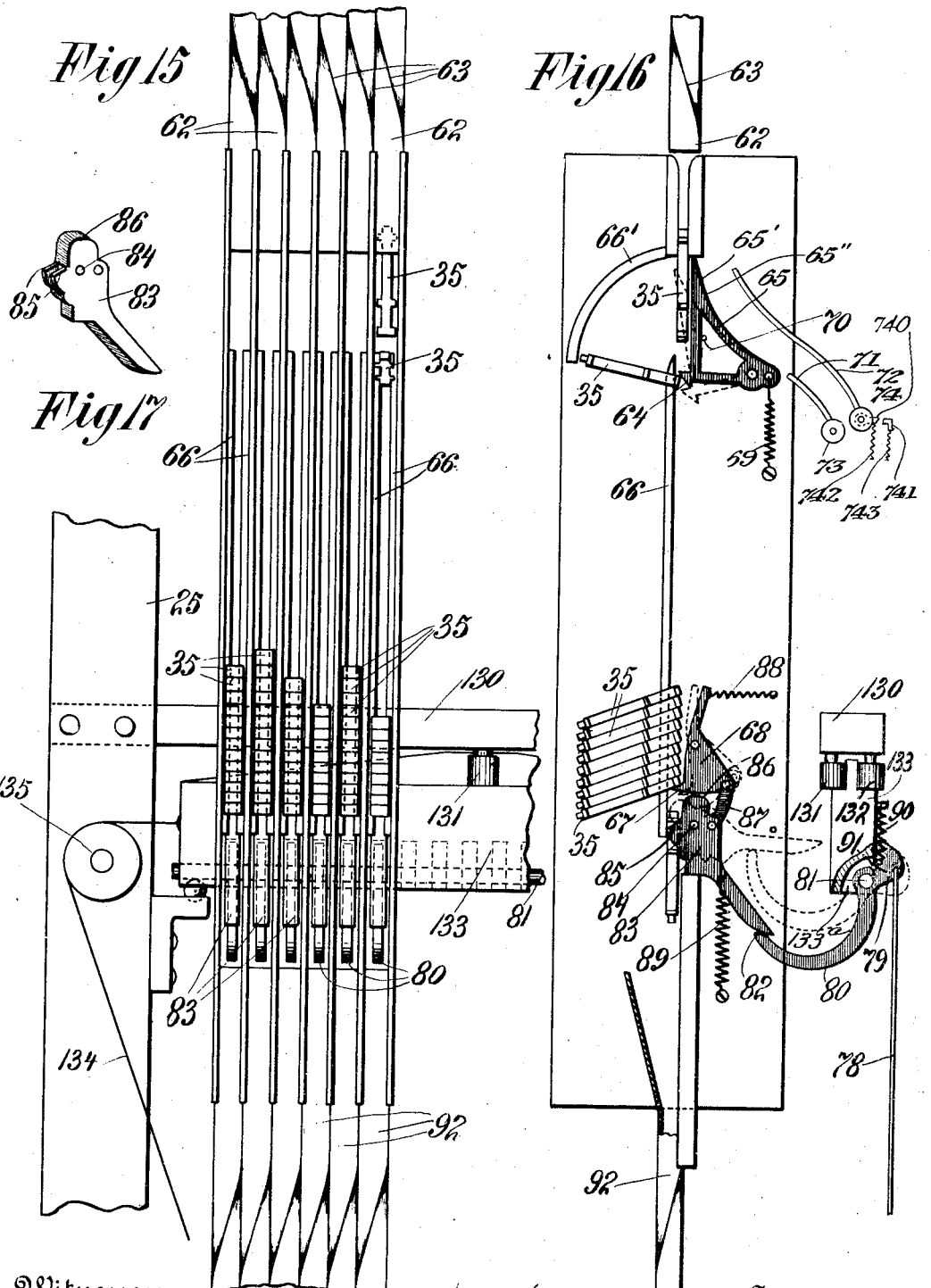

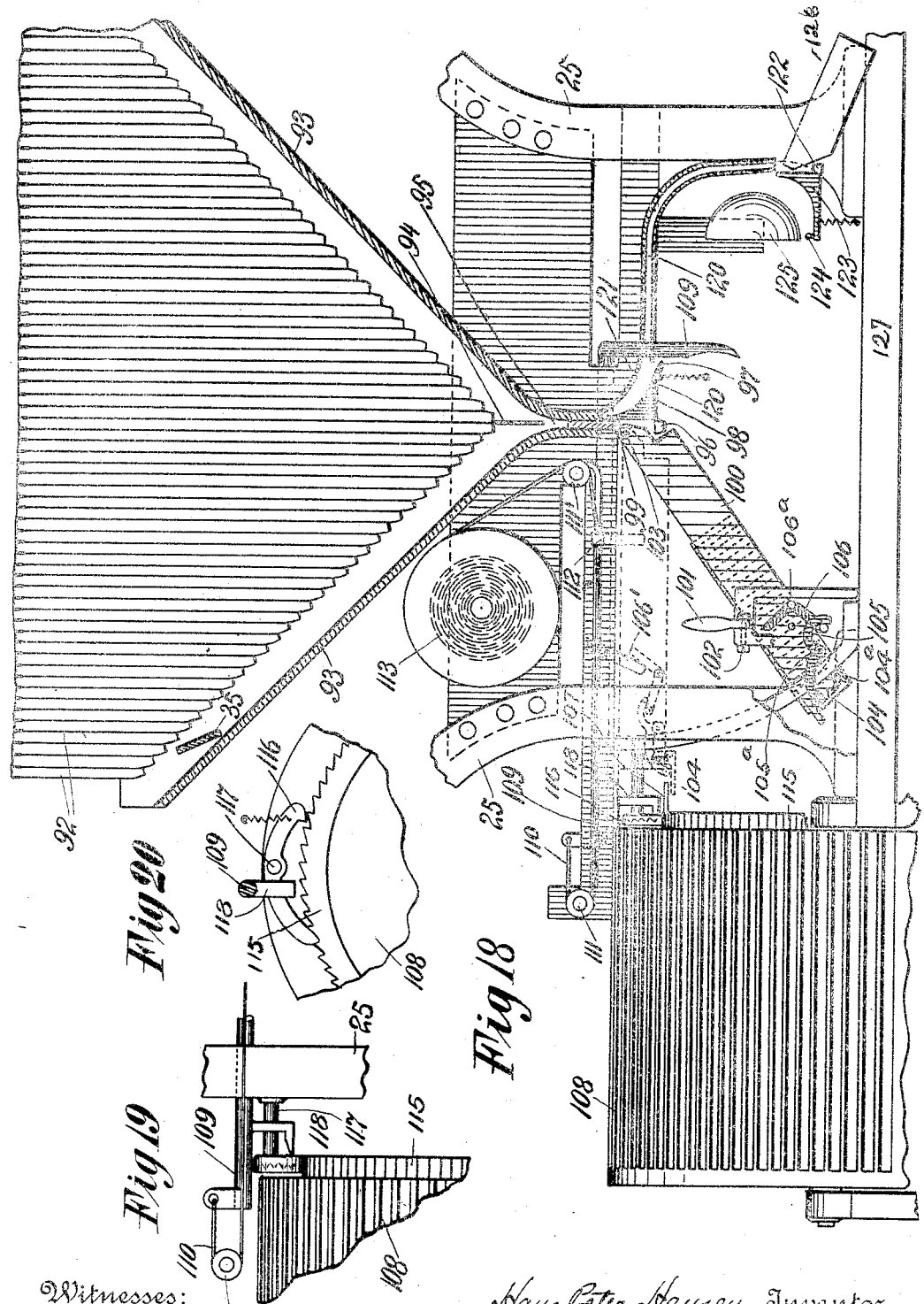

UNITED STATES PATENT OFFICE.

HANS PETER HANSEN, OF NEW YORK, N. Y.

TYPE-SETTING MACHINE.

1,188,762.      Specification of Letters Patent.      Patented June 27, 1916.

Application filed September 20, 1911, Serial No. 650,400. Renewed November 20, 1915. Serial No. 62,637.

*To all whom it may concern:*

Be it known that I, HANS PETER HANSEN, a subject of the King of Denmark, residing in the borough of Manhattan, in the county of New York and State of New York, have invented certain new and useful Improvements in Type-Setting Machines, of which the following is a specification, reference being had therein to the accompanying drawing.

My invention relates to improvements in typesetting machines, and is adapted to reduce labor, increase rapidity of operation and simplify construction.

In the accompanying drawings I have illustrated one application of my invention of which—

Figure 1 is a front elevation of the parts assembled. Fig. 2 is a side elevation looking from right to left of Fig. 1. Fig. 3 is a top view of the type-feeding mechanism, Fig. 4 a cross section on the line 4—4 of Fig. 3. Fig. 5 an enlargement of the right hand side of the feeding mechanism and Fig. 6 is a view looking from right to left at Fig. 5. Fig. 7 is a detail of the rear side of the distributing rails. Fig. 8 a detail of the front side of the distributing rail. Fig. 9 an end view of Figs. 7 and 8 in position. Fig. 10 a perspective view of Fig. 8 partly broken away. Fig. 11 are samples of the types used. Fig. 12 is a modified form of the composing stick. Fig. 13 a view looking from right to left at Fig. 12. Fig. 14 a detail of a stopping member. Fig. 15 is a detail of the type-conveying mechanism partly broken away. Fig. 16 a view from right to left at Fig. 15 with the extreme right wall omitted. Fig. 17 a perspective view of an oscillating member. Fig. 18 is an enlargement of the lower parts of the machine partly broken away. Fig. 19 is a detail of the escapement; Fig. 20 a view looking from right to left at Fig. 19 and Fig. 21 is a detail view of the driving mechanism.

Referring to Fig. 1, 25 are suitable supports and have at the upper extremity a transverse cross support 26 which is provided with bearings 27 and 28 for the main driving shaft 29. To the shaft 29 is fastened a suitable worm such as 30 engaging worm gear 31 which in turn is locked to the shaft 32 shown to better advantage in Figs. 2, 3 and 4. 33 is a cylindrical support or frame attached to the shaft 32 and has magazines 34 for type such as 35. 36 is a stationary plate suitably secured at 37 and 37' adjacent to the passage 38 and forms a bearing 39 for the shaft 32. The plate 36 also covers the entire area of the support or frame 33 thereby preventing the types from dropping except directly above the passage 38 where a suitable opening 40 is necessary to let the type descend. 41 is a shaft adapted to drive the chain 42 provided with fingers 43 for conveying the type. The shaft 41 is also provided with bevel gear 44 which meshes with a similar gear 45 mounted on the shaft $45^1$ of a worm gear 46 driven by the worm 47 on the shaft 48. It will be understood that upon the rotation of shafts 29 and 48 through the respective worms 30 and 47, the shafts 32 and 45' will rotate intermittently due to the fact that the engaging point 50, more specifically shown in Fig. 21 is slightly behind the disengaging point 51 on the longitudinal axis, consequently the time from 51 leaving the tooth till 50 engaging the next tooth will cause a stop, which will take place when the opening in the magazine is immediately above the opening 40, letting one type drop into the passage 38 while the stopping member 52 (shown to better advantage in Fig. 5) prevents more than one type from dropping at a time. Member 52 has a pair of upper spaced ribs 52' which during the rotation of cylinder 33 engage the reduced sections 35' of type 35, so that but the bottom type of each stack is permitted to drop while traveling across passage 38.

The fingers 43 are arranged in such a way that only one type can get in between two fingers and upon the intermittent motion of the chain 42 the fingers 43 will convey to and on the rails 54 and 55 all the type variously cut to engage the respective rails which will hereinafter be described more fully.

I prefer to employ type such as I have shown in Figs. 10 and 11 with the printing surface 56 facing downward; the distance between 56 and a shoulder 57 may be the same on all the type while the shoulders 58 vary in location on the type according to the rails 54 and 55 they are to engage. In Figs. 7, 8, 9, 10 I have shown to better advantage the transversely extended supports 60 and 61 and the distributing rails 54 and 55 on said supports. It will be seen now that when a type is conveyed on a rail such as *b*, the shoulder 58 will disengage the rail *b* at *b''* so that the opposite side of shoulder 58 of type 35 may continue to advance until it reaches the point $b'''$. At this point the type 35 will descend by virtue of gravity into the tube 62. To distinguish the type 35 they are classified in such a way that the type cut to engage rail $a$, will, upon leaving this rail engage whichever one of the rails $a'$ it is cut to correspond with, $b$ to correspond with $b'$, $c$ with $c'$, etc. Some of the type such as 56' only have the shoulder 58 extended on the one side so that these type will drop immediately upon leaving the rails $a$, $b$, $c$, $d$, $e$, $f$, $g$, $h$, not engaging the opposite rails at all.

Now referring to Figs. 15 and 16, 62 are vertically extended tubes or chutes adapted to receive the type 35. The tubes 62 are preferably provided with a twist of 90 degrees as indicated at 63 to allow the type 35 to revolve vertically while descending and said type, due to the straight fall, will strike the point 64 of the lever 65, causing 65 to tip over while guided by curved rails 66' and take the position shown in dotted outline, causing the type 35 to engage the rails 66 serving as guide ways for the type 35 until they assume the position shown at the lower extremity of 66 resting on the point or nose 67 of a tipping member or lever 68.

It will be seen that the type after leaving the distributing rails 54, 55 enter the upper portions of the tubes or chutes 62 in such a position that the type-flanks, $i.\ e.$ the parallel flat sides that connect the shouldered type-sides extend at right angles to the plane occupied by the row of tubes 62. By subsequently dropping the type through the twisted tube-sections 63, the formation of type stacks is rendered possible so that the longitudinal axes of the superposed individual type of each stack are located in a plane which extends at right angles to that of the row of tubes 62 as illustrated in Figs. 15 and 16, whereby space is greatly economized. The spring 69 will return 65 to its normal position as soon as the type has dropped. The stop 70 is merely to prevent 65 from being drawn to the right side due to the tension of the spring 69. After the stack of type has reached lever 65, the uppermost type will come to a rest upon the nose 64 of said lever, thereby maintaining the latter in the position shown in dotted lines in Fig. 16. In order to prevent a clogging of the device in case an additional type is admitted through tube 62, said type is diverted to a circuit interrupter that immediately stops the electromotor driving the machine. From Fig. 16 it will be seen that after a type has completed the stack, and lever 65 has thus been swung into the position shown in dotted lines, the peak 65' of said lever is projected across the type chute, so that the next type 35 will be sidetracked by being caused to slide along the curved edge 65'' of lever 65, and is then directed, by guides or plates 71, 72 to a pair of rollers 73, 74. Roller 73 is relatively fixed while roller 74 is by suitable means (not shown) drawn toward roller 73 until a gap is formed between said rollers that is slightly smaller than the thickness of the type. Roller 74 carries a movable contact 740 that is adapted to engage a fixed contact 741, contacts 740, 741 being, by wires 742, 743, connected to the interrupter hereinabove referred to. A type descending along edge 65'' and guides 71, 72 will enter the gap formed between rollers 73, 74 to force roller 74 to the right (Fig. 16) so as to close the contacts 740, 741 and thus actuate the interrupter for opening the electromotor circuit.

In Figs. 1, 2, 15, 16, 17, 18, 19 and 20 I have more specifically shown the operations of releasing the type, placing them in the stick and ejecting them into the printing magazine ready for printing. In Figs. 1 and 2, 76 are the keys which are pivoted at 77 to the machine support. To each key 76 is fastened one end of a cord or cable 78 the other end of which is connected at 79 to a striking lever 80. The several levers 80 are loosely mounted on a common spindle 81 of a slide 133, each lever 80 being accommodated within a recess 133$^a$ of said slide so as to participate in the lateral displacement thereof, for a purpose hereinafter more fully described. As thus far described it will be seen that by depressing one of the keys 76 the cable 78 will be pulled downward, raising the point 82 to the position shown in dotted lines. The lever 83, rotatably mounted at 84 will swing upward causing the type 35 to drop by gravity due to the fact that the cheeks 85 of lever 83 are drawn inwardly making a clear way for the first type, while the extension 86 is forming a blockage for the next type, and the arm 87 connecting 68 with 83 is swung sidewise as shown in dotted lines admitting one type to descend and rest on the extension 86. The springs 88, 89 and 90 will draw the mechanism back to its normal position after the previously depressed key has been released. For properly checking the return movement of levers 80, each of such levers is provided with an abutment 91 which by bearing against the outer face of slide 133 above recess 133$^a$, serves as a stop for said lever. After the type 35 have been released from the levers 83 they will drop, with the printing face upward, into a second series of vertically extended tubes such as 92 in which they will revolve preferably 90 degrees on the vertical axis before engaging the slantingly extended passages 93 illustrated more clearly in Fig. 18. The type 35 sliding down on the inner surface of 93 will strike a cross piece such as 94 which will prevent said type from blocking the narrow passage 95. Some of the lower tubes 92 have a slight curvature 92' shown in Figs. 1 and 2, the object being to lengthen the distance the type 35 have to travel and at the same time decrease the speed of said type in falling down, so as to insure that a type traveling from the extreme right or left hand side if released before a type in the center will reach the opening 95 before said type from the center. The type 35 after leaving the passage 95 will strike the projection 96 of lever 97 pivoted at 98. The point 99 of 97 will now knock the type sidewise into a composer stick 100 pivoted at 103. At its free end, stick 100 is closed by a flap 104 pivoted thereto at 104$^a$ and engaged by a bell crank lever 105 fulcrumed at 105$^a$. The latter is in turn engaged by an elbow lever 106 pivoted at 106$^a$ and adapted to strike a fixed abutment 106' of the machine. After a line has been completed, stick 100 is swung into its horizontal position by a hand lever 101 pivoted at 102 and projecting with its rear end underneath the stick (Fig. 2). During the last stage of the upward movement of stick 100, lever 106 engages abutment 106' and thus swings the parts 105, 104 into the position shown in dotted lines in Fig. 18, thereby opening flap 104, and permitting the ejecting of the line of type over fixed rail 107 into the corresponding slots of the rotatably mounted printing cylinder 108 which is an exact duplicate of cylinder 33 hereinabove referred to. The ejecting mechanism is operated by a hand lever 109, which, when moved to the right hand side will pull upon the cable 110 on the pulleys 111 and 111' kept tight by the spiral spring 113, thereby moving the finger 112 fastened to the cable 110 to the left hand side, the finger 112 in turn pushing the type 35 into the printing cylinder 108. In Figs. 19 and 20 I have shown in detail the escapement of the printing cylinder 108, which is permanently influenced by a spring (not shown) that imparts to said cylinder a revolving tendency. Cylinder 108 is provided with a ratchet wheel 115 engaged by a spring-influenced escapement lever 116 pivoted at 117 to frame 25. Lever 116 is adapted to be engaged by a chamfered finger 118 carried by handle 109 and designed to raise the left hand arm of lever 116 (Fig. 20) after a line of type has been discharged from stick 100 and after the handle has returned to its original position, thereby permitting the printing cylinder 108 to be advanced by its spring for the distance of one tooth.

When the compositor's stick 100 is filled with type completely with the last type resting on the projection 96 thereby forcing the point 99 of 97 over to the extreme left hand position, a channel such as 120 is formed between 97 and a plate such as 121 through which the next type will escape down to the point 122 of a tipping lever 123 whereby the hammer 124 will strike the bell 125 so that the operator will know the compositor's stick 100 is full of type.

126 is a magazine to receive the type coming through the channel 120.

127 is a suitable support for the lower part of the machine.

130 is a suitable support fastened to the main frame 25, said support having two rollers 131—132 preferably mounted in the center of the machine extending downwardly forming a roller bearing for the slide 133. This slide is normally held to the right hand side of the machine by virtue of the spring 135' and is operated against the tension of that spring by a wire such as 134 connected to a key such as 76, the wire 134 passing over the roller 135 shown to better advantage in Fig. 15. Upon striking the key referred to it will be observed that the wire 134 in pulling the slide 133 leftwardly, having the engaging members 80, disengages said engaging members 80 from their coacting members 83 thereby allowing the operator to depress the spacing key 76 without operating any of the aforesaid type delivery mechanism.

A modification of one of the details is shown in Figs. 12, 13 and 14 in which a compositor's stick consisting of two parallel members such as 140 and 141 is pivotally mounted at 148 and having slots such as 142 into which a stop such as 143 is adapted to project, said stop being adapted to slide upon the bar 144 which in turn is hinged at 145 as shown. This bar normally carries the stop 143 into the slots or openings 142 by virtue of the springs 146. The stop 143 it will also be observed is provided with a member 149 having an entering portion 150 which is adapted to engage the holes or ports in the said bar 144. This member 149 normally projects its entering portion 150 by virtue of the spring shown attached thereto, and for adjusting the entering member 143 along the bar it is only necessary to operate the member 150 with the finger and slide the same along the bar, the entering member 150 engaging one of the ports or openings when in the desired position.

Of course it will be understood that certain modifications may be made within the spirit and scope of this invention.

The operation is briefly stated as follows: After a cylinder 108 has been printed from, its type are properly washed whereupon the cylinder is fitted upon shaft 32 to occupy the place of cylinder 33 shown in Figs. 1, 2, 3, 4 and 5. The machine is then started to slowly revolve cylinder 108 so that its type will be consecutively discharged through opening 40 into the distributing mechanism. All type of like sort will thus be stacked along their rails 66 to be selectively released upon the depression of the corresponding keys 76. The consecutively freed type are conveyed to stick 100 in proper sequence to be then introduced into the corresponding grooves of cylinder 108. After the latter has been filled up with type-lines, the desired prints are taken, the cylinder is washed and finally fitted upon shaft 32 for the purpose of reassorting the type.

Having described my invention, what I claim and desire to secure by Letters Patent, is, 1. In a type-setting machine, an upper chute adapted to receive consecutive type face downward, said upper chute being provided with means for imparting to the descending type a quarter turn on their longitudinal axes, means for tipping the turned type, means for stacking the tipped type, means for consecutively releasing the bottom type from said stack, means for righting the released type face upward, a lower chute adapted to receive the righted type, said lower chute being also provided with means for imparting a quarter turn to the type, a composing stick, means for conveying the turned type to said stick, a printing cylinder, and means for transferring the type from the stick to said cylinder.

2. In a type-setting machine, an upper chute adapted to receive consecutive type face downward, said upper chute being twisted through an angle of substantially ninety degrees for imparting to the descending type a quarter turn on their longitudinal axes, means for tipping the turned type, means for stacking the tipped type, means for consecutively releasing the bottom type from said stack, means for righting the released type face upward, a lower chute adapted to receive the righted type, said lower chute being also twisted through an angle of ninety degrees for imparting a quarter turn to the type, a composing stick, means for conveying the turned type to said stick, a printing cylinder, and means for transferring the type from the stick to said cylinder.

3. In a type-setting machine, an upper chute adapted to receive consecutive type face downward, said upper chute being provided with means for imparting to the descending type a quarter turn on their longitudinal axes, a spring-influenced lever having a nose that is adapted to be engaged by a type whereby said lever is tilted to tip said type forward, a guide rail along which the tipped type are adapted to be stacked, means for consecutively releasing the bottom type from said stack, means for righting the released type face upward, a lower chute adapted to receive the righted type, said lower chute being also provided with means for imparting a quarter turn to the type, a composing stick, means for conveying the turned type to said stick, a printing cylinder, and means for transferring the type from the stick to said cylinder.

4. In a type-setting machine, an upper chute adapted to receive consecutive type face downward, said upper chute being provided with means for imparting to the descending type a quarter turn on their longitudinal axes, means for tipping the turned type, means for stacking the tipped type, means for sidetracking a type descending within the upper chute after the type-stack has been completed, means for consecutively releasing the bottom type from said stack, means for righting the released type face upward, a lower chute adapted to receive the righted type, said lower chute being also provided with means for imparting a quarter turn to the type, a composing stick, means for conveying the turned type to said stick, a printing cylinder, and means for transferring the type from the stick to said cylinder.

5. In a type-setting machine, an upper chute adapted to receive consecutive type face downward, said upper chute being provided with means for imparting to the descending type a quarter turn on their longitudinal axes, means for tipping the turned type, a guide rail along which the tipped type are adapted to be stacked, a first lever having a nose that supports the bottom type of the stack, a second lever linked to the first lever and having cheeks that are adapted to support the bottom type when released by the nose of the first lever, key-actuated means for actuating both of said levers, a lower chute adapted to receive the type after release from the cheeks, said lower chute being also provided with means for imparting a quarter turn to the type, a composing stick, means for conveying the turned type to said stick, a printing cylinder, and means for transferring the type from the stick to said cylinder.

6. In a type-setting machine, an upper chute adapted to receive consecutive type face downward, said upper chute being provided with means for imparting to the descending type a quarter turn on their longitudinal axes, a lever arranged below said upper chute and adapted to be tilted by said type, thereby tipping said type forward, and a guide rail along which the tipped type are adapted to be stacked, the lever being provided with an inclined edge for sidetracking a descending type after the completion of the stack.

7. In a type-setting machine, a removable rotary cylinder containing type, a plurality of type chutes arranged below said cylinder, each chute being adapted to receive type of like sort, a type distributing device intermediate said cylinder and chutes, type-stacking means located below each chute, a lever intermediate each chute and its type-stacking means, said lever being adapted to be tilted by the descending type and having an inclined edge for sidetracking a descending type after the completion of the stack, and means controlled by the sidetracked type for arresting the cylinder.

8. In a type-setting machine, a removable rotary cylinder containing type, a plurality of type chutes arranged below said cylinder, each chute being adapted to receive type of like sort, a type distributing device intermediate said cylinder and chutes, type-stacking means located below each chute, a lever intermediate each chute and its type-stacking means, said lever being adapted to be tilted by the descending type and having an inclined edge for sidetracking a descending type after the completion of the stack, a stationary and a movable roller adapted to be engaged by the sidetracked type, and means controlled by the movable roller for arresting the cylinder.

9. In a type-setting machine, an upper chute adapted to receive consecutive type face downward, said upper chute being provided with means for imparting to the descending type a quarter turn on their longitudinal axes, means for tipping the turned type, means for stacking the tipped type, and means for releasing the bottom type of the stack.

10. In a type-setting machine, an upper chute adapted to receive consecutive type face downward, said upper chute being provided with means for imparting to the descending type a quarter turn on their longitudinal axes, means for tipping the turned type, means for stacking the tipped type, and key-controlled means for releasing the bottom type of the stack.

11. In a type-setting machine, an upper chute adapted to receive consecutive type face downward, said upper chute being provided with means for imparting to the descending type a quarter turn on their longitudinal axes, means for tipping the turned type, means for stacking the tipped type, key-controlled means for releasing the bottom type of the stack, a normally inclined pivoted composing stick adapted to receive the released type, a slotted printing cylinder, means for swinging the composing stick into alinement with one of the cylinder-slots, and means for transferring the type from the stick to the alined cylinder-slot.

12. In a type-setting machine, an upper chute adapted to receive consecutive type face downward, said upper chute being provided with means for imparting to the descending type a quarter turn on their longitudinal axes, means for tipping the turned type, means for stacking the tipped type, key-controlled means for releasing the bottom type of the stack, a normally inclined pivoted composing stick adapted to receive the released type, a gate fulcrumed to the free end of said stick, a slotted printing cylinder, means for swinging the composing stick into alinement with one of the cylinder slots, automatic means actuated upon a swinging of the stick for opening the gate, and means for transferring the type from the stick to the alined cylinder-slot.

13. In a typesetting machine, a plurality of chutes arranged in a common substantially upright plane, each chute being adapted to receive type of like sort face downward, the flat sides of the type extending at right angles to said plane, said chutes being provided with means for imparting to the descending type a quarter turn on their longitudinal axes, means for separately stacking the turned type of like sort, and means for releasing the bottom type of consecutively selected stacks.

14. In a typesetting machine, a plurality of chutes arranged in a common substantially upright plane, each chute being adapted to receive type of like sort face downward, the flat sides of the type extending at right angles to said plane, said chutes being provided with means for imparting to the descending type a quarter turn on their longitudinal axes, means for tipping the turned type forward, and means for separately stacking the tipped type, the longitudinal axes of the superposed type of each stack being located in a plane which extends at right angles to the plane of the chutes.

15. In a type-setting machine, a plurality of chutes arranged in a common substantially upright plane, each chute being adapted to receive type of like sort face downward, the flat sides of the type extending at right angles to said plane, said chutes being provided with means for imparting to the descending type a quarter turn on their longitudinal axes, means for tipping the turned type forward, means for separately stacking the tipped type of like sort, means for releasing the bottom type of consecutively selected stacks, means for righting the released type face upward, a printing cylinder, and means for transferring said righted type to said cylinder.

16. In a type-setting machine, a plurality of upper chutes arranged in a common substantially upright plane, each chute being adapted to receive type of like sort face downward, the flat sides of the type extending at right angles to said plane, said chutes being provided with means for imparting to the descending type a quarter turn on their longitudinal axes, means for tipping the turned type forward, means for separately stacking the tipped type of like sort, means for releasing the bottom type of consecutively selected stacks, means for righting the released type face upward, a plurality of lower chutes also arranged in a common substantially upright plane and adapted to receive the righted type, said lower chute being provided with means for imparting to the descending type a quarter turn, a printing cylinder, and means for transferring the type to said cylinder.

17. In a type-setting machine, a plurality of upper chutes arranged in a common substantially upright plane, each chute being adapted to receive type of like sort face downward, the flat sides of each type extending at right angles to said plane, said chutes being provided with means for imparting to the descending type a quarter turn on their longitudinal axes, means for tipping the turned type forward, means for separately stacking the tipped type of like sort, means for releasing the bottom type of consecutively selected stacks, means for righting the released type face upward, a plurality of lower chutes also arranged in a common substantially upright plane and adapted to receive the righted type, said lower chutes being provided with means for imparting to the descending type a quarter turn, a composing stick, means for conveying the type to said stick, a printing cylinder, and means for transferring the type from the stick to said cylinder.

In testimony whereof I affix my signature in presence of two witnesses.

HANS PETER HANSEN.

Witnesses:
AUG. P. JURGENSEN,
THOMAS V. HILL.